United States Patent

Heemann et al.

Patent Number: 5,985,074
Date of Patent: Nov. 16, 1999

[54] ADHESIVE SYSTEM FOR STICKING ALL-ROUND LABELS

[75] Inventors: Marcus Heemann; Eckhard Puerkner, both of Duesseldorf; Wolfgang Klingberg, Korschenbroich; Bernhard Herlfterkamp, Bottrop; Hermann Onusseit, Haan; Ralf Gossen, Duisberg, all of Germany

[73] Assignee: Henkel Kommanditgesellschaft auf Aktien, Duesseldorf, Germany

[21] Appl. No.: 08/983,158

[22] PCT Filed: Jun. 24, 1996

[86] PCT No.: PCT/EP96/02753

§ 371 Date: Dec. 22, 1997

§ 102(e) Date: Dec. 22, 1997

[87] PCT Pub. No.: WO97/01483

PCT Pub. Date: Jan. 16, 1997

[30] Foreign Application Priority Data

Jun. 26, 1995 [DE] Germany .......................... 195 22 568
May 6, 1996 [DE] Germany .......................... 196 17 962
May 9, 1996 [DE] Germany .......................... 196 18 549

[51] Int. Cl.$^6$ ..................................................... B65C 1/00
[52] U.S. Cl. ...................... 156/215; 156/155; 156/315; 156/344; 428/43
[58] Field of Search ..................... 156/215, 155, 156/344, 315; 428/43

[56] References Cited

U.S. PATENT DOCUMENTS

| | | |
|---|---|---|
| 4,447,502 | 5/1984 | Sommerer . |
| 4,567,681 | 2/1986 | Fumei . |
| 4,612,721 | 9/1986 | Fumei . |
| 4,671,836 | 6/1987 | Fumei . |
| 4,749,739 | 6/1988 | Foster et al. . |
| 5,321,933 | 6/1994 | Seiffert et al. .......................... 156/215 |
| 5,455,066 | 10/1995 | Broich et al. . |
| 5,518,571 | 5/1996 | Puerkner et al. ....................... 156/155 |

FOREIGN PATENT DOCUMENTS

| | | |
|---|---|---|
| 0 143 621 | 6/1985 | European Pat. Off. . |
| 0 219 267 | 4/1987 | European Pat. Off. . |
| 0 503 112 | 9/1992 | European Pat. Off. . |
| 0 531 618 | 3/1993 | European Pat. Off. . |
| 31 37 324 | 4/1983 | Germany . |
| 34 42 997 | 6/1985 | Germany . |
| 34 42 998 | 6/1985 | Germany . |
| 34 34 141 | 3/1986 | Germany . |
| 36 37 465 | 5/1987 | Germany . |
| 1386968 | 3/1975 | United Kingdom ................... 156/332 |
| WO92/03515 | 3/1992 | WIPO . |
| WO93/03110 | 2/1993 | WIPO . |

Primary Examiner—John J. Gallagher
Attorney, Agent, or Firm—Ernest G. Szoke; Wayne C. Jaeschke; Daniel S. Ortiz

[57] ABSTRACT

The invention is an adhesive system for applying wrap around labels to containers. The system comprises a hotmelt pick-up adhesive which is active at the temperature which the label is applied and loses its bonding ability after the adhesive sets and an overlap adhesive for bonding the label overlap. At its application temperature, the pick-up adhesive has significantly higher adhesiveness, measured at its application temperature than at its conventional storage temperature. In addition, the adhesive preferably has a greater affinity for the label than for the container bearing the label. Consequently, the label can be easily removed from the hollow body without leaving residues of adhesive. If, nevertheless, a residual adhesive should remain on the hollow body, it can be dissolved by an alkaline solution.

16 Claims, No Drawings

ADHESIVE SYSTEM FOR STICKING ALL-ROUND LABELS

DETAILED DESCRIPTION OF THE INVENTION

This invention relates to an adhesive system for applying wrap-around labels to hollow containers and to a process for forming a readily breakable bond between wrap-around labels and hollow containers using this adhesive system.

BACKGROUND OF THE INVENTION

At the present time, casein-based glues are mainly used for labeling hollow containers, for example glass and polyethylene terephthalate bottles. These aqueous formulations are mainly based on a casein component and a tackifier resin along with certain additives. WO 93/03110, for example, is mentioned in this regard. This document describes an adhesive based on casein, water-soluble extenders, fillers and, optionally, other additives, the adhesive characteristically containing resinic acid derivatives and alcohol. This provides for the satisfactory labeling of wet glass bottles, even at temperatures of 15° C. and even if the casein content is well below the usual concentrations of more than 18% by weight.

Unfortunately, the above-mentioned labeling adhesives containing a casein component have the disadvantage that the labels are extremely difficult to remove during cleaning. Thus, the following inter alia is stated in European patent application 503 112, column 1, line 36 to column 2, line 52: "Hitherto, the labels have been washed off with heated wash liquor using large quantities of water. The soil content of the wastewater is correspondingly difficult to handle because not only is it necessary to filter the waste-water to remove cellulose fibers, it is also particularly important to eliminate metal components, more particularly aluminium compounds, from the wastewater where they accumulate to a considerable extent from the print on the labels, i.e. from the pigment components of the labels. The labels are removed in the bottle washing machine using an approximately 2.5% sodium hydroxide solution at an average temperature of 82° C. During this removal process, parts of the paper coating and hence pigments and lacquers from the print on the labels naturally pass over into the sodium hydroxide solution. Labels thus contaminate the liquor with soils which are now classified on the basis of chemical oxygen demand (COD). Breweries have to pay their wastewater dues according to the COD level."

In European patent application 503 112, it is proposed to solve the problem by mechanically removing the label from the empties before washing. This is made possible by inserting a separating layer between the label and the original adhesive layer. The label can thus be removed without tearing. However, the adhesive layer remains on the bottle and has to be removed by wash liquor. Accordingly, the problem of completely removing the labels is not solved.

According to DE-OS 34 34 141, the original adhesive (glue) is replaced by an assembly or fixing adhesive. This adhesive is supposed to have the property of not curing. Accordingly, a label applied to a bottle with this adhesive can be completely removed at any time. What the adhesive consists of is not disclosed. The adhesive is applied over the entire area between the surface of the bottle and the label. However, it is a disadvantage of fixing adhesives that they require a dry substrate.

In their prospectus entitled "Autosleeve", published in 1993, the Automated Label Systems Company proposes a polyethylene wrap-around label for labeling bottles which is drawn over the bottle in its expanded state and, after contracting, applies itself firmly to the bottle. Accordingly, no adhesive at all is used here. The label is cut through with a high-pressure water jet in the same way as with a knife. Apparently the bottle is not damaged. However, the polyethylene label still has to be disposed of.

German patent 34 42 998 describes a process for applying a wrap-around label to a container. In this process, a limited zone of the front part of the label is initially attached to the wall of the container and, after wrapping of the label around the container, a limited zone of the rear end overlapping the front end is joined thereto. A thermoplastic, co-extruded polymer with a foamed layer is used as the label. A viscous, solidifying solution is formed on the foamed layer in the limited zone of the front label by means of a solvent for the polymer for the purpose of establishing a temporary connection between the limited zone of the foamed layer and the wall of the container, which automatically weakens again on evaporation of the solvent, the constituent material of the container being unaffected by the solvent. The disadvantage of this process is that a low-boiling solvent, for example methylene chloride, an aromatic or chlorinated aliphatic hydrocarbon, has to be used for application.

German patent 34 42 997, which was filed on the same date at the German Patent Office, relates to a similar process for applying a wrap-around label to a container. In this process, however, a thermoplastic polymer alone rather than a thermoplastic co-extruded polymer with a foam layer is used for the label. In this process, too, ecologically unsafe, rapidly evaporating chlorine-containing or aromatic solvents have to be used to apply the wrap-around label.

It is also known that amorphous poly-α-olefins can be used as a basis for hotmelt adhesives. Corresponding hotmelt adhesives are distinguished by good adhesion to LDPE film and by firm fixing to porous substrates so that they may be used in particular for sanitary articles (diapers or the like). It is known that resins may be added to these basic polymers, saturated resins of low polarity being the most compatible. Compatible resins such as these generally act as tackifiers for amorphous poly-α-olefins. In addition, it is also known that waxes, such as polyethylene, Fischer-Tropsch or microcrystalline waxes, are also compatible with amorphous polyolefins and also bring about a reduction in viscosity, a change in pot life and reduced penetration. However, the listed examples of hotmelt adhesives show that the poly-α-olefin always has to be used as the main component, optionally in conjunction with another resin and/or another wax as secondary components.

The problem addressed by the present invention was to provide an adhesive which would be suitable for applying wrap-around labels to hollow containers, such as bottles, cans, etc., and which could be removed easily and completely from the hollow container before cleaning. However, neither the labeling process nor the handling of the labeled containers would be adversely affected in any way and, in particular, labeling would even be possible in high-performance machines.

This problem has been solved by an adhesive system which contains two different hotmelt adhesives, namely one for permanently bonding the overlap zone of the wrap-around label and one for temporarily bonding the label during its pickup.

Accordingly, the present invention relates to an adhesive system for applying wrap-around labels which comprises a pickup adhesive and an overlap adhesive and which is characterized in that the pickup adhesive has sufficient adhesive strength for labeling at its application temperature, i.e. an adhesive strength of 0.005 to 0.03 N/mm² at 80 to 200° C., and has hardly any adhesive strength after it has set, more particularly at its storage temperature of 5° C. to 30° C.

The adhesive strength of the pickup adhesive at room temperature is so low that the label can be easily and completely removed from the hollow container, preferably without leaving any adhesive residues behind. During application from the melt, the adhesive strength is sufficient to enable the label to be exactly positioned, even at high speeds. Because the adhesive remains completely or partly on the label, there is no longer any need for the complicated bottle washing process required in the prior art where the wash liquor is soiled with label material and adhesive. Accordingly, the washing of reusable bottles is barely affected, if at all, by adhesives or even by label residues.

Whether and how much pickup adhesive remains on the container after delabeling depends to a large extent on its surface characteristics. If the adhesive strength at room temperature is substantially equal to or even greater than that on the label surface, the adhesive will more or less remain on the container, even though its adhesive strength according to the invention is very low. Accordingly, the pickup adhesive is best also alkali-soluble. Otherwise, it is sufficient if the pickup adhesive has hardly any adhesive strength at room temperature, remains on the label and is insoluble in alkalis.

In one preferred embodiment of the present invention, the alkali-insoluble pickup adhesive in the adhesive system according to the invention contains 10 to 100% by weight and preferably 30 to 35% by weight of at least one amorphous poly-α-olefin, 0 to 40% by weight and preferably 5 to 30% by weight of at least one plasticizer based on an aromatic dicarboxylic acid ester, 0 to 50% by weight and preferably 15 to 40% by weight of at least one natural, chemically modified or synthetic wax and typical auxiliaries and additives.

In the context of the invention, an amorphous poly-α-olefin which is used as a component of the pickup adhesive forming part of the labeling adhesive system according to the invention is understood to be a homopolymer or copolymer of at least one of the comonomers ethylene, propylene and 1-butene or 1-hexene. These monomers are normally polymerized either individually or optionally in the form of a mixture under low pressure in the presence of a Ziegler-Natta catalyst. The poly-α-olefins preferably have a molecular weight of around 30,000 to around 60,000 g/mole.

A plasticizer based on aromatic dicarboxylic acid esters, i.e. the corresponding ester of phthalic acid, isophthalic acid or terephthalic acid, is used as a potential component of the alkali-insoluble pickup adhesive of the labeling adhesive system according to the invention. The alcohol radical in these esters used as plasticizer normally contains 1 to 8 carbon atoms.

Another potential component of the alkali-insoluble pickup adhesive of the labeling adhesive according to the invention is at least one natural, chemically modified or synthetic wax. Any waxes compatible with amorphous poly-α-olefins may be used for this purpose. The natural waxes may be vegetable waxes, animal waxes, mineral waxes or petrochemical waxes. The chemically modified waxes include hard waxes, such as montan ester waxes, Sarsol waxes, etc. The synthetic waxes used are polyalkylene waxes and also polyethylene glycol waxes. For economic reasons, petrochemical waxes, such as petrolatum, paraffin waxes, microwaxes and synthetic waxes, especially polyethylene waxes with melting points of 85 to 140° C. and molecular weights of 500 to 3,500, paraffin waxes with melting points of 45 to 70° C. and molecular weights of 225 to 500, microcrystalline waxes with melting points of 60 to 95° C. and synthetic Fischer-Tropsch waxes with melting points of 100 to 115° C., are preferably used.

In addition, typical auxiliaries and additives may be incorporated in the alkali-insoluble pickup adhesive. These include above all stabilizers of which the function is to prevent the reactive monomers from entering into an unwanted or premature reaction and to protect the polymers against decomposition during processing. Antioxidants are particularly suitable for this purpose. They are normally added to the pickup adhesive in quantities of up to 3% by weight and preferably in quantities of around 0.5% by weight.

In one preferred embodiment, the pickup adhesive according to the invention is also soluble in alkalis, i.e. it saponifies and dissolves completely in a 1% sodium hydroxide solution at 50° C. up to a concentration of 10% by weight within 24 hours, preferably within 3 hours and above all within 20 minutes. Accordingly, the pickup adhesive remaining on the container generally also dissolves during washing in a wash liquor. The wash liquors are generally water-containing media with a pH value of 8 to 14.

A "water-containing medium" in the context of the invention is understood to be a solution, dispersion or emulsion of an organic or inorganic alkaline water-containing substance which is capable of dissolving organic substances containing hydrolyzable or salt-forming groups. Examples of organic bases are alkanolamines, more especially (poly) ethanolamines, while examples of inorganic substances are alkali metal hydroxides, alkali metal carbonates and alkali metal sesquicarbonates, but especially the corresponding sodium and potassium compounds. Sodium hydroxide and potassium hydroxide are particularly preferred, normally being used in the form of aqueous solutions with concentrations of 0.5 to 40% by weight.

In one preferred embodiment of the present invention, the pickup adhesive contains I. 20 to 98% by weight of at least one alkali-soluble polymer which serves as the backbone polymer, II. 1 to 70% by weight of at least one resin based on functional hydro-carbon resins and optionally modified natural resins, III. 0.5 to 30% by weight of at least one plasticizer and IV. 0 to 3% by weight of at least one typical auxiliary and additive.

The backbone polymer essentially determines cohesion and temperature behavior. It is used in a quantity of, preferably, 30 to 70% by weight and, more preferably, 50 to 65% by weight. The backbone polymer is selected from a) saturated and/or unsaturated polyesters, above all based on aromatic dicarboxylic acids, such as phthalic acid or terephthalic acid, more particularly from polyesters of phthalic acid, neopentyl glycol and glycerol or pentaerythritol, b) polyacrylic and/or polymethacrylic acid alkyl esters containing 1 to 18 and, more particularly, 1 to 4 carbon atoms, c) acrylic acid homopolymers and/or copolymers, d) vinyl polymers, for example polyvinyl alcohol with a molecular weight above 1,000, polyvinyl pyrrolidone, vinyl pyrrolidone/vinyl acetate copolymers, polyvinyl ethers, more particularly polyvinyl alkyl ethers containing 1 to 4 carbon atoms in the alkyl group, for example polyvinyl methyl ether or polyvinyl ethyl ether.

The resin is intended to tackify the backbone polymer and to improve the compatibility of the hotmelt adhesive components. It is preferably used in a quantity of 1 to 15% by weight or 15 to 70% by weight. The resin is selected from a) hydroabietyl alcohol and esters thereof, more especially esters with aromatic carboxylic acids, such as terephthalic acid and phthalic acid, b) preferably modified natural resins, such as resinic acids of balsam resin, tallol resin or wood rosin, for example fully saponified balsam resin or alkyl esters of optionally partly hydrogenated colophony with low softening ranges, for example methyl, diethylene glycol, glycerol and pentaerythritol esters, c) acrylic acid copolymers, preferably styrene/acrylic acid copolymers, and d) a resin based on functional hydrocarbon resins.

An alkyl ester of partly hydrogenated colophony is preferably used as the tackifying resin, the alkyl group preferably containing 1 to 6 carbon atoms.

The plasticizer is preferably present in the hotmelt adhesive in a concentration of 5 to 20% by weight. Suitable plasticizers are monohydric or polyhydric alcohols, preferably glycol monophenyl ether, hexamethylene glycol, glycerol and, in particular, polyalkylene glycols with a molecular weight of 200 to 6,000. Polyethylene glycols with a molecular weight of up to about 1,000 and preferably up to about 600 are preferred. Polypropylene glycol, polybutylene glycol and polymethylene glycol are also suitable. Esters, for example liquid polyesters and glycerol esters, such as glycerol diacetate and glycerol triacetate, and neopentyl glycol dibenzoate, glyceryl tribenzoate, pentaerythritol tetrabenzoate and 1,4-cyclohexane dimethanol dibenzoate, are fit for use as the plasticizers. Finally, alkyl monoamines and fatty acids preferably containing 8 to 36 carbon atoms may also be used.

Stabilizers and antioxidants, for example tris-(nonylphenyl)-phosphite, are mentioned as typical auxiliaries and additives.

The above-mentioned components form the alkali-soluble hotmelt adhesive according to the invention. It is insoluble in water, even if individual components should be soluble. Accordingly, it is distinguished for example by high resistance to condensation.

The thermal stability of the hotmelt adhesive according to the invention is sufficient in practice for permanent use (multishift working) at application temperatures of up to 160° C. This is surprising in view of the thermal instability of individual raw materials, for example polyethers and saponifiable polyesters.

The viscosity of the hotmelt adhesive according to the invention, which is at most 1 to 2 Pas at 140° C. (Brookfield, Thermacell RVT II, ASTM D3236-88), is remarkably low in view of the high polar forces of individual raw materials. Accordingly, the hotmelt adhesive according to the invention may be used in a variety of installations.

The adhesive properties of the hotmelt adhesive according to the invention depend to a very large extent upon the composition of the raw materials mentioned above and, accordingly, may readily be adapted to the particular problem to be solved on the basis of specialist knowledge. Thus, permanently tacky hotmelt adhesives can be obtained by a high concentration of plasticizer. Hotmelt adhesives with sufficient tackiness for labeling and with very poor adhesion at room temperature can be obtained by a low concentration of plasticizer, particularly the polyol. Adhesives such as these are suitable as pickup adhesives for wrap-around labels because the labels are thus easy to remove before washing of the container. Because its adhesive properties can be varied by varying the formulation, the adhesive according to the invention is suitable not only as a pickup adhesive for wrap-around labels, but also for bonding paper, board, plastics and nonwovens.

The overlap adhesive used is a standard labeling adhesive with adequate flexibility. It performs an equalizing function in the event of expansion of the bottle through the emission of carbon dioxide from bottles of thermoplastics at elevated temperature. The overlap adhesive contains tackifying resins as its principal component, plasticizers and polymers as secondary components and typical auxiliaries and additives. Compared with the pickup adhesive, the overlap adhesive has more or less uniform tackiness over a broad temperature range of −10 to 200° C. When the overlap adhesive is applied, however, it is important to ensure that it does not come into contact with the container, more particularly the bottle.

If the containers in question, more particularly bottles, do not demand such flexibility, the above-mentioned pickup adhesive itself may also be used as the overlap adhesive.

The containers to be labeled in the context of the invention are in particular hollow containers, such as bottles, cans, drums, tubes or cartridges. They consist essentially of optionally plated or galvanized (metal, for example tin plate or aluminium, glass or thermoplastics,) such as polyethylene terephthalate, polycarbonate, polyethylene, polypropylene, polyvinyl chloride or polystyrene. A polar plastic, more particularly a polyester, is preferably used. Corresponding hollow containers are used in particular for mineral waters and refreshing drinks.

The labels consist on the one hand of (thermoplastics,) such as polyethylene, polypropylene, polystyrene, polyvinyl chloride or cellophane. It is preferred to use labels of a film based on nonpolar plastics, more particularly oriented polypropylene (OPP). In that case, a pickup adhesive based on poly-α-olefin is preferably used. However, the wrap-around labels may also be based on (paper,) optionally in combination with a polymer. Depending on the material and the production process, the following labels, for example, may be used: simple labels of nonfinished paper, labels of surface-finished paper, high-gloss labels of cast-coated label papers, labels of papers coated with aluminium by vapor deposition and labels of aluminium-lined papers.

The shape of the labels does not have to meet any particular requirements although the labels must be wrap-around labels.

The present invention also relates to a process for applying wrap-around labels optionally containing perforations to containers, more particularly hollow containers, using an adhesive system of the type described above, characterized in that it comprises the following steps:

a. transferring a pickup adhesive to at least part of the back of a wrap-around label or to the bottle at temperatures of 80 to 200° C. and preferably 120 to 180° C. in the case of alkali-insoluble hotmelt adhesives based on poly-α-olefins and at temperatures of 90 to 160° C. in the case of alkali-soluble ester-based hotmelt adhesives, b. applying the wrap-around label and joining the back of one end to the front of the other end by the overlap adhesive and c. leaving the wrap-around label to cool.

The present invention also relates to a process for removing the wrap-around labels applied in accordance with the invention from hollow containers, characterized in that, after it has been cut through, optionally at the perforations, the wrap-around label is removed from the hollow container by light mechanical force. This is preferably done by removing the wrap-around label from the hollow container by light mechanical force after it has been cut through, but especially by applying compressed air, contrarotating rollers which pull the label off the bottle or water pressure as the mechanical force. Accordingly, the adhesive system according to the invention is particularly suitable for recyclable hollow containers in the sense of returnable containers and general recycling.

Finally, the present invention relates to the use of the labeling adhesive system according to the invention for labeling hollow containers, more particularly bottles of glass, metal and/or plastics, with wrap-around labels.

The adhesive system according to the invention is also suitable for high-performance machines capable, for example, of applying 10 labels per second.

EXAMPLES

The invention is illustrated by the following Examples.

A) Hotmelt Adhesive Based on Poly-α-Olefins

Production Example A1

27 Parts by weight of the plasticizer phthalic acid dicyclohexylester, 38.5 parts by weight of a polyethylene wax and 0.5 part by weight of an antoxidant are mixed at 150° C. until a homogeneous mixture is obtained. 34 Parts by weight of an amorphous poly-α-olefin with a molecular weight of around 35,000 glmole are then added to the resulting mixture.

A 100 μm thick and 1 cm wide film of the above-described pickup adhesive was applied to a Kofler bench, after which a 1 cm wide label film of oriented polypropylene was placed on the adhesive and subjected to light pressure. The bonded area measured 1 cm×1 cm. The film was peeled off by a tensile tester. The necessary force was read off from the tensile tester. Tackiness and hence the pickup properties were evaluated by rolling a bottle over the label with adhesive on the Kofler bench, the following adhesive strength values being obtained:

Application Example A1

A pickup adhesive according to Example 1 was applied in a quantity of 50 g/m² at 145° C. to the back of labels in a Contiroll labeling machine (manufactured by the Krones company of Neutraubling, FRG) and served to pick up the label and to hold it in place on the bottle pending application of the overlap adhesive. An overlap adhesive according to Production Example 2 was then applied to the front part of the back of the label, but in such a way that it did not come into direct contact with the bottle.

After the polyethylene terephthalate bottle including the wrap-around label had left the labeling machine, a label positioned firmly on the bottle by the overlap bond was obtained after cooling.

Delabeling itself was carried out by cutting the label open at the perforations present, if any. In this way, the label is held solely by the pickup adhesive 1 although, as shown in Example 1 above, the pickup adhesive is only very slightly tacky when cold, i.e. at room temperature or 20° C. to 40° C., so that the label can be removed from the bottle by light mechanical force. The adhesive remains completely on the label. The same applies even when the labeled bottle has been stored under typical conditions (40° C., rain) before delabeling.

B) Alkali-Soluble Hotmelt Adhesives

Production Example B1

Production of an alkali-soluble pickup adhesive with better adhesion at the application temperature than at room temperature.

A pickup adhesive was prepared by mixing and homogenizing 59.0% by weight of the saturated aromatic polyester Phthalopal®NP (an oil-free phthalate resin marketed by BASF AG) based on phthalic acid, pentaerythritol and neopentyl glycol, 20.0% by weight of a styrene/acrylic acid copolymer (ACX 12-436), 10.0% by weight of a colophony alkyl ester (Herkolyn®D marketed by Hercules Inc.), more particularly a methyl ester of partly hydrogenated colophony, 10.0% by weight of a polyethylene glycol with a molecular weight of 400 (Polydiol 400) and 1.0% by weight of a stabilizer (Irgafos®TNPP, marketed by Ciba Geigy) based on tris-(nonylphenyl)-phosphite at elevated temperature.

Production Example 2

A standard overlap hotmelt adhesive for labeling cans, glass and polyethylene bottles was produced, for example, in

| Temperature (°C.) | 60 | 70 | 80 | 90 | 100 | 110 | 120 | 130 | 140 | 150 |
|---|---|---|---|---|---|---|---|---|---|---|
| Adhesive strength (N/mm²) | 0.000 | 0.000 | 0.000 | 0.000 | 0.008 | 0.020 | 0.016 | 0.004 | 0.004 | 0.002 |

Production Example A2

A standard overlap hotmelt adhesive for labeling cans, glass and polyethylene terephthalate bottles was produced, for example, in accordance with the teaching of U.S. Pat. No. 4,749,739 by reacting 50 parts by weight of an amorphous poly-α-olefin, 20 parts by weight of a synthetic polycarbonate resin, 20 parts by weight of a glycerol ester of partly hydrogenated colophony, 10 parts of a synthetic hard wax based on a polyethylene wax, which had been obtained by the Fischer-Tropsch process, and 0.4 parts by weight of antioxidants at elevated temperature.

accordance with the teaching of U.S. Pat. No. 4,749,739 by reacting 50 parts by weight of an amorphous polya-α-olefin (Vestoplast V3649 marketed by Hüls AG), 20 parts by weight of a synthetic polyterpene resin (Wingtack®95, Goodyear Tire & Rubber Company), 20 parts by weight of a glycerol ester of partly hydrogenated colophony (Fhoral®85, Hercules Inc.), 10 parts by weight of a synthetic hard wax based on a polyethylene wax, which had been obtained by the Fischer-Tropsch process (Vestowax A 616, Hüls AG), and 0.2 part by weight of each of the antioxidants Irganox®1010 (Ciba-Geigy) and lrganox®PS 802 (Ciba-Geigy) at elevated temperature.

Application Example B1

The pickup adhesive was applied to a bottle of polycarbonate at 120 to 150° C. and had sufficient tackiness at that temperature to pick up the wrap-around label of polypropylene from the label box. The label was then held on the bottle until it fitted sufficiently firmly thereon following the application of an overlap adhesive according to Example 2 to the back of the label end.

For small bottles with minimal volume expansion and for paper labels, the pickup adhesive of Example 1 may also be used for the overlap bond, i.e. as the overlap adhesive.

The pickup adhesive is disintguished in particular by the fact that it is only slightly tacky when cold or in storage (room temperature) so that, after it has been cut open, for example with a knife, it can be removed very easily from the bottle. No tearing occurs, particularly in the case of paper labels, which has the advantage over the standard known process that the label is thus completely removed before the bottle washing machine. Accordingly, the wash liquor is not soiled by paper residues. After the labels have been removed by light mechanical force, the adhesive remains largely on the bottle, but dissolves very quickly, i.e. in 2 to 10 minutes, and completely in the following wash liquor, for example a 1% sodium hydroxide solution, at 80° C. The pickup adhesive according to the invention is substantially non-hygroscopic and does not penetrate even uncoated paper labels.

What is claimed is:

1. A process for ring a readily breakable bond between wrap-around labels, optionally containing perforations, and hollow containers comprising the steps of:

applying a hotmelt pickup adhesive to at least part of the surface of the wrap-around label or to the container at about 80 to about 200° C., wherein the pick-up adhesive has suffcient adhesive strength for labelling at a temperature above which it sets and hardly any adhesive strength after it has set, applying the wrap-around label to the container before the pick-up adhesive has set, joining a back of one end of the wrap-around label to a front of a second end of the wrap-around label with an overlap adhesive; and cooling the wrap-around label.

2. A process for removing wrap-around labels applied in accordance with claim 1 from containers, comprising the steps of:

cutting through the wrap-around label; and separating the wrap-around label from the container by light mechanical force.

3. A process as claimed in claim 2, wherein the mechanical force is applied in the form of compressed air or water pressure.

4. A system for applying a wrap-around label to a container comprising:

a hotmelt pick-up adhesive, wherein the hotmelt pick-up adhesive has sufficient adhesive strength for labeling at its application temperature and has hardly any adhesive strength between itself and at least one of the container or the label after it has set.

5. An adhesive system as claimed in claim 4, wherein said pickup adhesive has strength of about 0.005 to about 0.030 N/mm$^2$ at said application temperature and wherein said application temperature is about 80 to about 200° C.

6. An adhesive system as claimed in claim 4, wherein the pickup adhesive comprises:

about 10 to about 100% by weight of at least one amorphous poly-α-olefin, 0 to about 40% by weight of at least one plasticizer based on an aromatic dicarboxylic acid ester; and 0 to about 50% by weight of at least one wax.

7. An adhesive system as claimed in claim 4, wherein the pickup adhesive dissolves substantially completely in an about 1% sodium hydroxide solution over a period of about 1 day at about 50° C.

8. An adhesive system as claimed in claim 4, wherein the pickup adhesive comprises:

about 20 to about 98% by weight of at least one alkali-soluble backbone polymer, about 1 to about 70% by weight of at least one resin based on functional hydrocarbon resins and optionally modified natural resins, and about 0.5 to about 30% by weight of at least one plasticizer.

9. An adhesive system as claimed in claim 4, wherein the overlap adhesive comprises tackifying resins as its principal component and plasticizers and polymers as secondary components.

10. A process for labelling hollow containers such as bottles, cans, drums, tubes or cartridges with wrap-around labels, wherein a hotmelt pick-up adhesive is applied to the lable or container, the label wrapped around the container overlap adhesive is applied to a portion of the label overlap and the overlapped portions of the label joined, the improvement which comprises; labelling with the adhesive system claimed in claim 4.

11. The improved process of claim 10, wherein the surfaces of the containers to be labeled comprise optionally plated or galvanized metal, glass, ceramic or thermoplastics.

12. The improved process of claim 10, wherein the optionally plated or galvanized metal is plated with tin.

13. The improved process of claim 10, wherein the metal is aluminium.

14. The improved process of claim 10, wherein the thermoplastics are polyethylene terephthalate, polyvinyl chloride, polypropylene, polyethylene, polycarbonate or polystyrene.

15. The improved process of claim 10, wherein the wrap-around labels comprise paper or a thermoplastic.

16. The improved process of claim 10, wherein the wrap-around labels comprise oriented polypropylene.

* * * * *